A. J. SCHWARZENBACH AND B. W. TUCKER.
MACHINE FOR SHAPING ARTIFICIAL FLOWER PETALS.
APPLICATION FILED MAY 10, 1919.

1,353,426.

Patented Sept. 21, 1920.
11 SHEETS—SHEET 7.

A. J. SCHWARZENBACH AND B. W. TUCKER.
MACHINE FOR SHAPING ARTIFICIAL FLOWER PETALS.
APPLICATION FILED MAY 10, 1919.

1,353,426.

Patented Sept. 21, 1920.
11 SHEETS—SHEET 8.

Inventors
Alvin J. Schwarzenbach
and Benjamin W. Tucker
By their Attorney

UNITED STATES PATENT OFFICE.

ALWIN J. SCHWARZENBACH, OF HASBROUCK HEIGHTS, AND BENJAMIN W. TUCKER, OF SOUTH ORANGE, NEW JERSEY; SAID TUCKER ASSIGNOR, BY MESNE ASSIGNMENTS, OF HIS RIGHT TO MICHAEL GOLD, OF NEW YORK, N. Y.

MACHINE FOR SHAPING ARTIFICIAL-FLOWER PETALS.

1,353,426. Specification of Letters Patent. Patented Sept. 21, 1920.

Application filed May 10, 1919. Serial No. 296,210.

*To all whom it may concern:*

Be it known that we, ALWIN J. SCHWARZENBACH and BENJAMIN W. TUCKER, citizens of the United States, and residents of Hasbrouck Heights, in the county of Bergen and State of New Jersey, and of South Orange, in the county of Essex and State of New Jersey, respectively, have invented certain new and useful Improvements in Machines for Shaping Artificial-Flower Petals, of which the following is a specification.

This invention relates to improvements in machines for making artificial flowers.

The principal object of the invention is to provide means for longitudinally creasing and transversely curling and crimping or crinkling, simultaneously, a series of petal-like extensions on a blank adapted to be used in making an artificial flower.

A further object of the invention is to provide means for feeding blanks successively to the creasing, crimping and curling means, and means for removing the creased and curled blanks from the feeding means.

Other objects of the invention are to provide means for preventing buckling of the blanks during the scoring, crimping and curling thereof and to provide means for properly positioning the petals relatively to the scoring and curling means.

Figures 1, 2, 3:
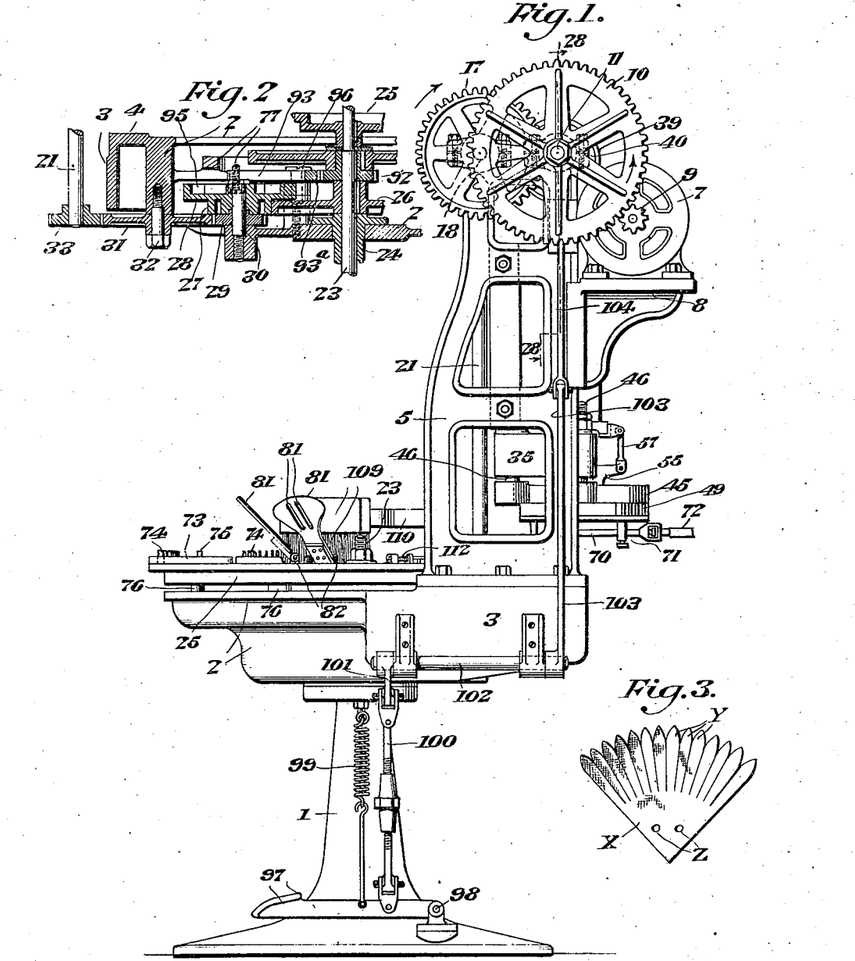
Figure 1 is a side elevation of the machine.
Fig. 2 a fragmentary vertical section on the line 2—2 of Fig. 36, showing the Geneva movement for actuating the feed table.
Fig. 3 a plan view of one of the petal blanks.
Figures 4, 5, 6, 7:
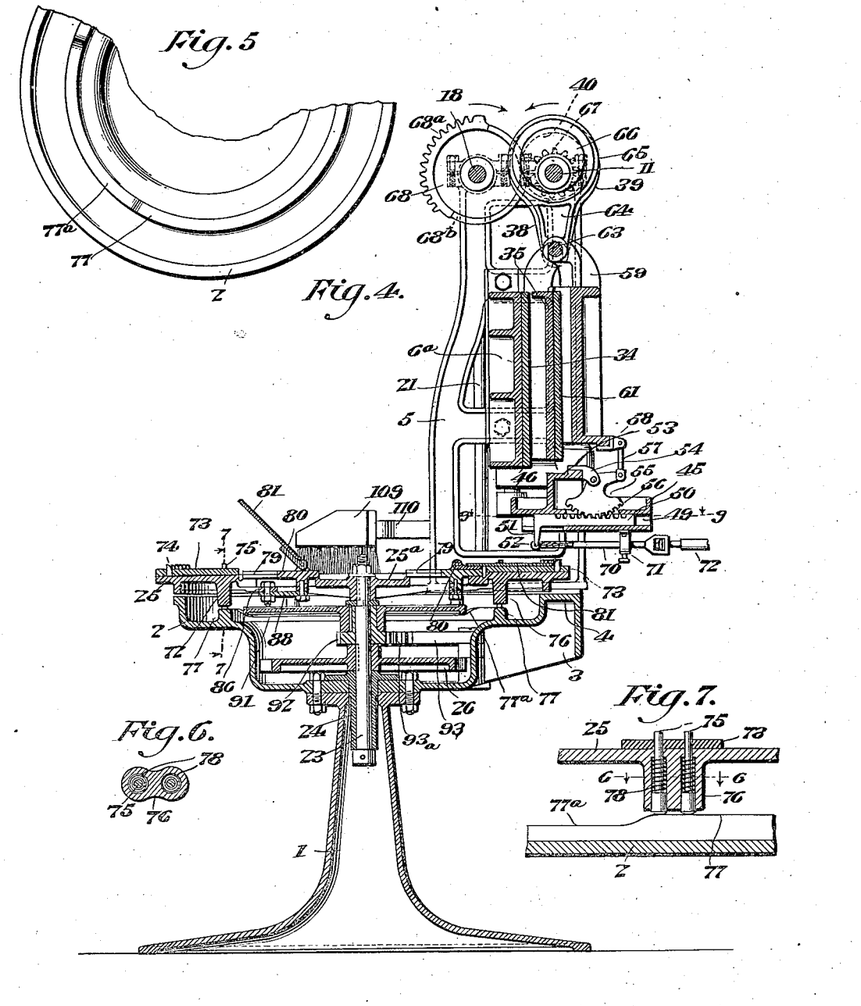
Fig. 4 a vertical section on the line 4—4 of Fig. 8.
Fig. 5 a fragmentary top plan view of the base of the machine.
Fig. 6 a horizontal section on the line 6—6 of Fig. 7.
Fig. 7 a detail vertical section on the line 7—7 of Fig. 4.

The blank and machine shown in the accompanying drawings are especially designed for use in the manufacture of artificial chrysanthemums, but it is obvious that the machine may be readily adapted to operate on blanks having petals of various forms for use in making various other varieties of artificial flowers. The machine is designed to longitudinally crease or score, transversely crimp or crinkle, and partially curl, simultaneously, a plurality of radially extending petals formed by slitting a blank of sector form inwardly along converging lines from its curved edge, a plan view of one of the blanks being shown in Fig. 3 of the drawings. Means is provided for feeding blanks successively to the scoring, crinkling and curling means, for preventing buckling of the blanks during scoring, crinkling and curling thereof, for insuring proper positioning of the petals relatively to the scoring, crinkling and curling means, and for successively removing the blanks from the feeding means after the petals have been scored, curled and crinkled.

Referring to the various parts by numerals, 1 designates a suitable pedestal or standard, to the upper end of which is rigidly held a stationary base 2 of substantially bowl-shaped form. The base 2 is formed at the rear of the machine with a lateral extension having a top plate 4 flush with the upper edge of the base 2 and depending flanges 3. A pair of upright frame members or standards 5 are fixed to the top plate 4, and said standards are connected intermediate their upper and lower ends by a transversely extending I-beam 6. An electric motor 7 is supported on a bracket 8 fixed to the rear side of one of the standards 5. A pinion 9 fixed on the drive shaft of the motor 7 meshes with a gear wheel 10 loosely mounted on a stationary shaft 11 supported in the upper ends of the standards 5. The gear wheel 10 is formed with an internal clutch surface 12 forming one member of a friction clutch, the other member 13 of which is slidably held to a sleeve 14 by a suitable key 15. The sleeve 14 is loosely mounted on the stationary shaft 11 and is formed at its inner end with a pinion 16 meshing with a gear 17 which is fixed on a shaft 18 journaled in suitable bearings in the upper ends of the standards 5. A bevel pinion 19 is fixed on the opposite end of the shaft 18 and meshes with a bevel pinion 20 fixed on the upper end of a vertically extending shaft 21 journaled in suitable brackets 22 held to the outer side of the adjacent standard 5.

A shaft 23 extends vertically through the bowl-shaped base 2 centrally of the base, said shaft being journaled in a suitable bearing 24. A rotary table or turret 25 is keyed to the upper end of the shaft 23 and is adapted to be rotated step by step in the direction indicated by the arrows in the drawing, by a suitable Geneva motion comprising a Geneva gear 26 keyed on the shaft 23 and adapted to be alternately rotated and locked in the usual manner by a roller 26ª and a mutilated locking hub 27 held to the lower side of a disk 28. The disk 28 is fixed to the upper side of a pinion 29 and said disk and pinion are loosely mounted on a stub shaft 30 held to the bottom wall of the base 2. The side wall of the bowl-shaped base 2, adjacent the stub shaft 30, is cut away, and a gear 31 extends through the opening formed by thus cutting away the wall of the base 2 and meshes with the pinion 29. The gear 31 is loosely mounted on a stub shaft 32 and meshes with a pinion 33 fixed to the lower end of the shaft 21.

The transversely extending I-beam 6 is formed midway its ends with a portion having a rearwardly off-set, vertically extending web 6ª, said web projecting rearwardly beyond the planes of the rear edges of the top and bottom flanges of the I-beam and extending below the bottom flange of the I-beam, as shown more clearly in Figs. 10, 11, 23 and 25. A guide plate 34 is held to the rear side of the web 6ª by suitable screws, the side edges of said plate extending beyond the side edges of the off-set web 6ª. A vertically reciprocable cross-head 35 is slidably held to the guide plate 34, said cross-head being formed with suitable guideways 36 in which the projecting edges of the plate 34 engage. The cross-head 35 is pivotally connected at its upper end at 37 with the lower ends of a pair of pitmen 38. The two pitmen 38 are formed at their upper ends with eccentric straps 39 embracing a pair of eccentrics 40 loosely mounted on the stationary shaft 11 between suitable spacing collars. Pinions 41 are fixed to one face of each of the eccentrics 40, said pinions being loosely journaled on the shaft 11 and adapted to be intermittently engaged and rotated alternately by the toothed portions 42ª and 42ᵇ of a pair of mutilated gears 42 fixed on the shaft 18. Each gear 42 is formed with two arcuate locking flanges 42ᶜ and 42ᵈ extending between the adjacent ends of the toothed portions 42ª and 42ᵇ thereof, and each pinion 41 has a locking block fixed to one face thereof, formed with oppositely disposed locking shoes 43 and 44 adapted to intermittently engage the locking flanges 42ᶜ and 42ᵈ respectively, to positively lock the cross-head 35 in its upper and lower positions. The pinions 41 are adapted to be rotated through half a revolution by each of the toothed portions 42ª and 42ᵇ of the mutilated gears 42 so as to move the cross-head downwardly and upwardly for each revolution of the shaft 18. A pressure-head 45 is yieldably held to the lower end of the cross-head 35 by four bolts 46, the upper portions of the shanks of which are of reduced diameter to form shoulders 46ª engaged by the lower ends of springs 47. The springs 47 are coiled about the reduced shank portions of the bolts 46 and the upper ends of the springs engage the upper ends of the enlarged portions 48 of the bolt holes. The pressure-head 45 is formed with a series of guide-ways 49 converging toward the forward sides of the machine. A series of racks 50 are slidably mounted in the guide-ways 49 to move inwardly and outwardly toward and from a common center. Each rack 50 is provided at its forward end with a depending arm 51, at the lower end of which is journaled a grooved roller 52. The pressure-head 45 is formed with a raised arcuate portion 53 on its upper side, to the rear edge of which a radial series of bearing yokes 54 are held. A series of bell cranks 55 are pivotally held to the yokes 54, said bell cranks being each formed with a depending arm provided with a segmental toothed portion 56 extending through a slot in the top wall of the head 45 and meshing with the teeth of one of the racks 50. Each bell crank is provided with a rearwardly extending arm connected with the lower end of one of a series of links 57. The upper ends of the links 57 are pivotally held to yokes 58 fixed to the lower end of a vertically reciprocable cross-head 59.

The cross-head 59 is formed with suitable guide-ways 60 in which the edges of a guide plate 61 engage. The guide plate 61 is fixed to a rib 62 formed on the rear side of the cross-head 35, said rib extending vertically centrally of the cross-head and being narrower than the guide plate 61. The cross-head 59 is pivotally connected at 63 with the lower end of a pitman 64. The pitman 64 is formed at its upper end with an eccentric strap 65 embracing the eccentric 66 loosely mounted on the shaft 11 between suitable stop collars. A pinion 67 loosely mounted on the shaft 11 is fixed to one face of the eccentric 66. The pinion 67 is adapted to be intermittently engaged and rotated by the toothed portion 68$^a$ of a mutilated gear 68. The pinion 67 is adapted to be rotated through one complete revolution by the toothed portion 68$^a$ of gear 68 for each revolution of the shaft 18. The gear 68 is formed with an arcuate locking flange 68$^b$ adapted to be intermittently engaged by a locking shoe 69 fixed to one face of the pinion 67 to lock the cross-head 59 against movement during a portion of each revolution of the shaft 18 as hereinafter described. The eccentric 66 has a greater throw than the eccentrics 40 to adapt the pitman 64 to move the cross-head 59 a greater distance than the cross-head 35 is moved by the eccentrics 40 and pitmen 38, for a purpose hereinafter described. The radially arranged series of rollers 52 are adapted to be heated by an arcuate gas burner 70 held to the lower side of the pressure-head 45 by a suitable bracket 71. The gas burner 70 is adapted to be connected to any suitable source of fuel supply by a flexible tube 72.

The feed table 25 is provided with a series of radially arranged blank or petal supports or plates 73 of the same general sector form as the blanks X, said supports being fixed to the upper side of the table adjacent the perimeter of the table and being preferably formed of rubber or other suitable yieldable material. Each blank support 73 is provided with an arcuate series of upstanding metallic petal positioning fingers 74, preferably fixed to the table, and with a pair of blank positioning and retaining pins or plungers 75. Each pair of pins 75 are slidably guided in one of a series of lugs or projections 76 depending from the table 25 within the bowl-shaped base 2, the lower ends of said pins riding upon a circular track 77 formed on the base 2. The track 77 is provided with a depression 77$^a$ at the left-hand side of the machine for a purpose hereinafter described, and the pins 75 are normally forced downwardly by coil springs 78, to permit the upper ends of the pins to move downwardly below the upper face of the blank supports 73 when the lower ends of the pins move over the depressed portions of the track. The blanks X are formed with a series of radially extending petals Y, as before described, the tapered ends of which are adapted to lie between fingers 74, and are also provided with two apertures Z in which pins 75 engage when the blanks are placed upon the supports 73.

The table 25 is formed with a central depressed portion 25$^a$ provided with a series of radially extending slide-ways 79, one for each blank support 73, in each of which is mounted a slide 80 movable horizontally radially of the table. Each slide 80 carries a gripper or clamping plate 81 pivotally held to the slide by a rock shaft 82 extending through a yoke on the slide and provided with a depending rock arm 83 at one end adapted to engage one of a series of stops or abutments 84 on the table to rock the gripper 81 upwardly when the slides approach the inner limit of their movement, as more fully hereinafter described. A spring 85 is coiled about each shaft 82 and secured to the rock arm and yoke to normally force the grippers downwardly.

Figure 8:
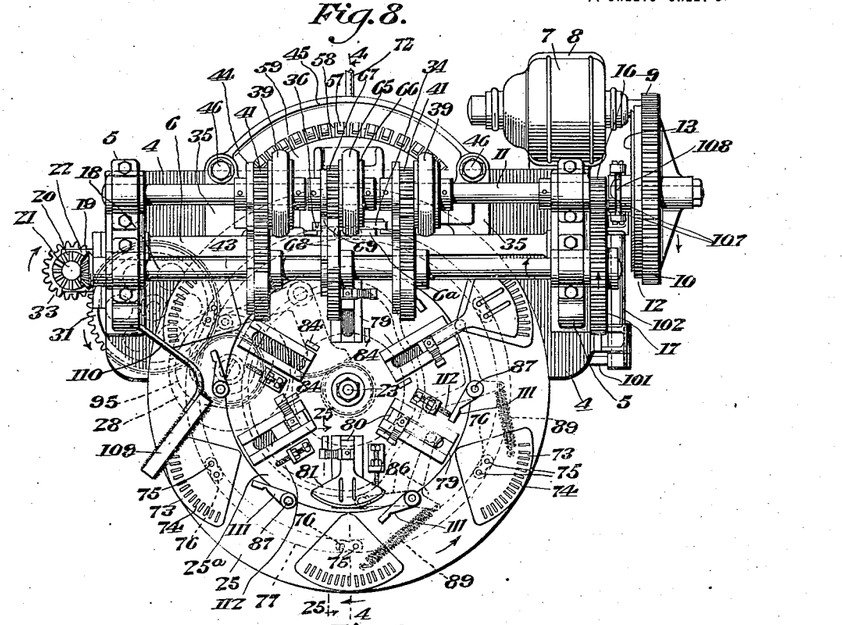
Fig. 8 a plan view of the machine.
Figure 9:
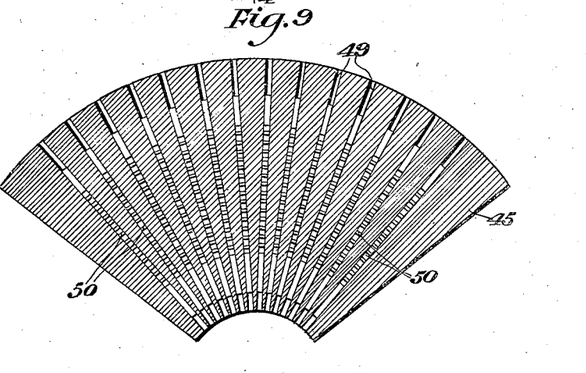
Fig. 9 a horizontal section on the line 9—9 of Fig. 4.
Figures 10, 11:
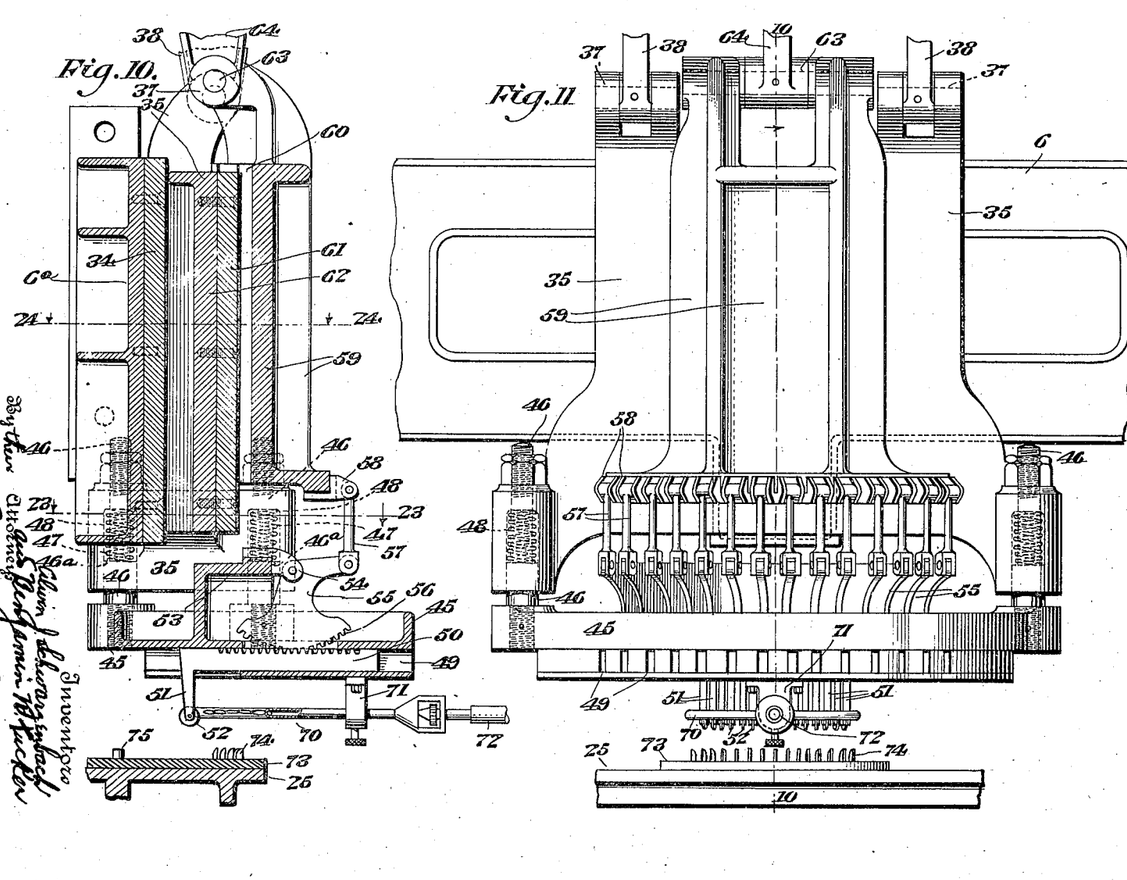
Fig. 10 a vertical section on line 10—10 of Fig. 11.
Fig. 11 a fragmentary rear elevation of a part of the machine.
Figures 12, 13, 14:
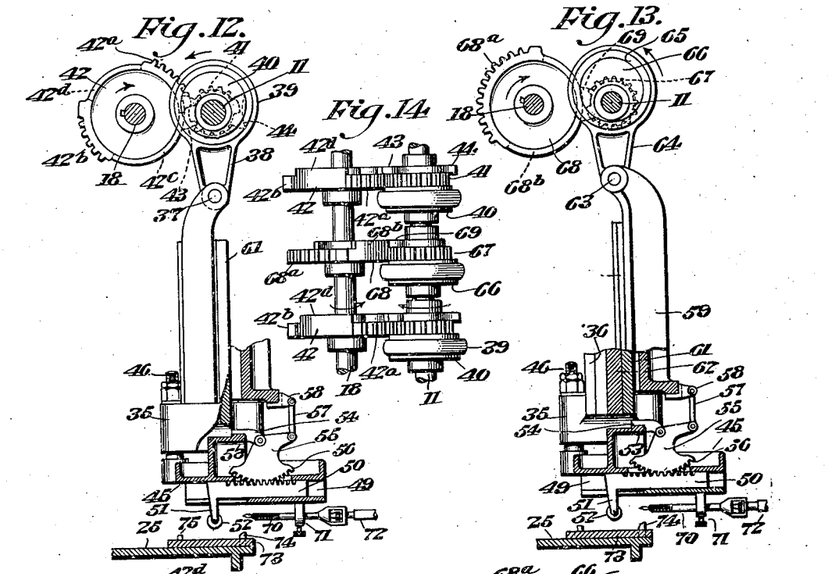
Figs. 12, 13 and 14 are fragmentary views illustrating the normal positions of the parts of the creasing, crimping and curling mechanism.
Figure 36:
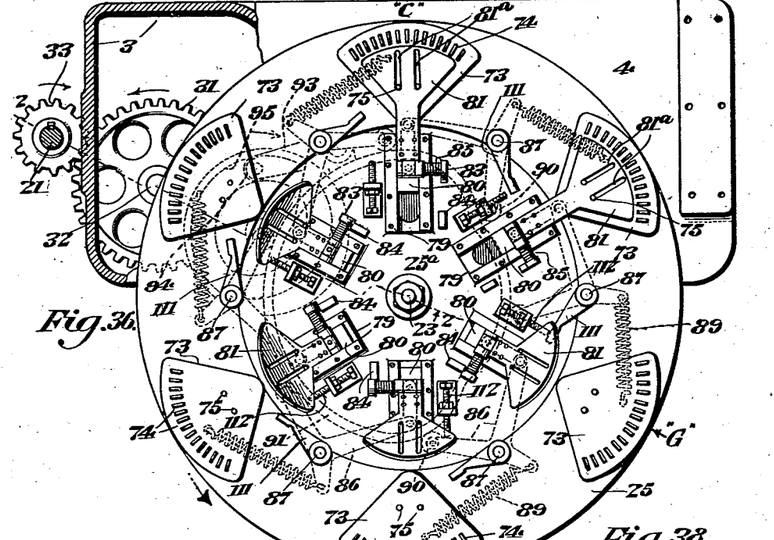
Fig. 36 a plan view of the blank feeding mechanism.
Figures 37, 38:
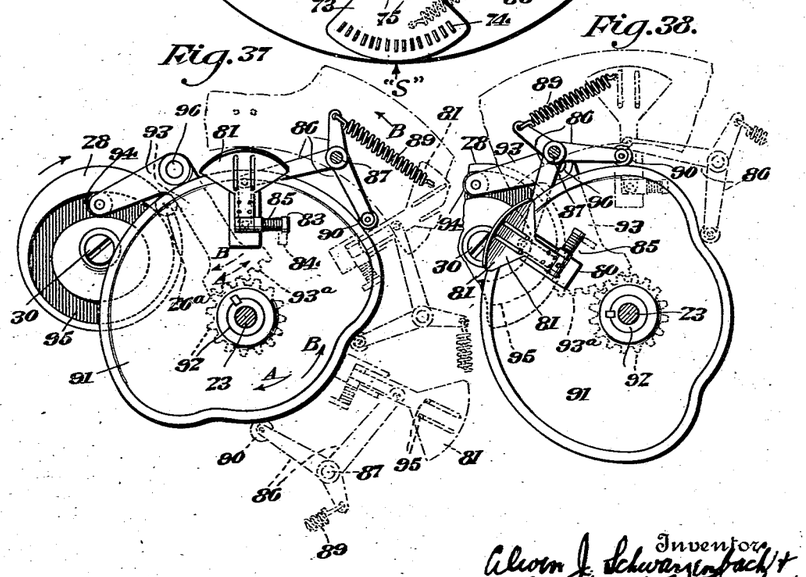
Figs. 37 and 38 diagrammatic views showing the operation of the cam mechanism controlling the blank gripping devices.
Figures 39, 40, 41, 42, 43, 44, 45:
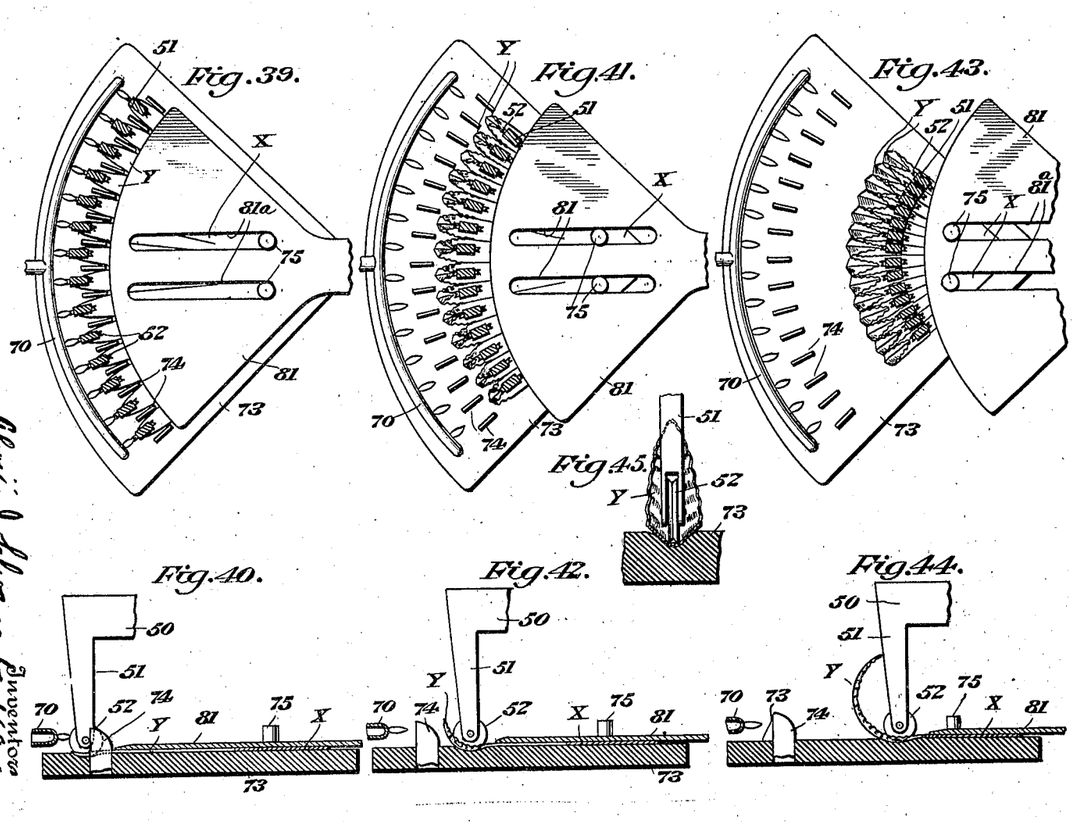
Figs. 39 to 45, inclusive, detail views showing the creasing, crimping and curling operation.

Each slide 80 is adapted to be moved inwardly and outwardly by a three-arm lever 86. Each lever 86 is fixed at the junction of its three arms to one of a series of vertical rock shafts 87 journaled in suitable bearings on the table 25 and extending through said table. One arm of lever 86 is connected to the slide by a link 88, and a second arm of the lever is connected with the table by a spring 89 which normally tends to rock the lever in a direction to move the slide outwardly and permit gripper 81 to move downwardly upon the blank support 73. The outward movement of the slides is limited by rock arms 111 fixed on the upper ends of rock shafts 87 and adapted to engage adjustable stops 112 on table 25. A roller 90 carried by the other arm of lever 86 engages the edge of an oscillatory cam disk 91 which is adapted to rock the lever as hereinafter described to force the slides inwardly. The cam 91 is fixed on the hub of a pinion 92 which is loosely mounted on the vertical shaft 23. The cam 91 is adapted to be rocked in opposite directions by a bell-crank lever 93, one arm of which is formed with a segmental toothed rack 93ª meshing with pinion 92, and the other arm of which carries a roller 94 engaging in a cam groove 95 in disk 28. The bell-crank 93 is fulcrumed on a stub shaft 96 held to the base 2. The disk 28 is rotated through one complete revolution from the position shown in Figs. 8, 36 and 38 for each revolution of shaft 18.

The clutch member 13 is adapted to be shifted into engagement with clutch member 12 by means of a suitable treadle 97 pivotally held at its rear end at 98 to the pedestal 1 and normally held in raised position by a coiled spring 99. The treadle 97 is connected by a link 100 with a rock arm 101 fixed on the forward end of a rock shaft 102 journaled in suitable brackets held to one of the depending flanges 3 on the lateral extension 4 of the base 2 at the right-hand side of the machine. A vertically extending rock arm 103 is fixed at its lower end to the rear end of rock shaft 102 and is pivotally connected at its upper end with the lower end of a lever 104. The lever 104 is pivotally held at 106 to a suitable bracket fixed on the adjacent standard 5, and is formed with a forked upper end carrying pins 107 engaging in a groove 108 in the hub of the shiftable clutch member 13.

Figures 15, 16, 17:
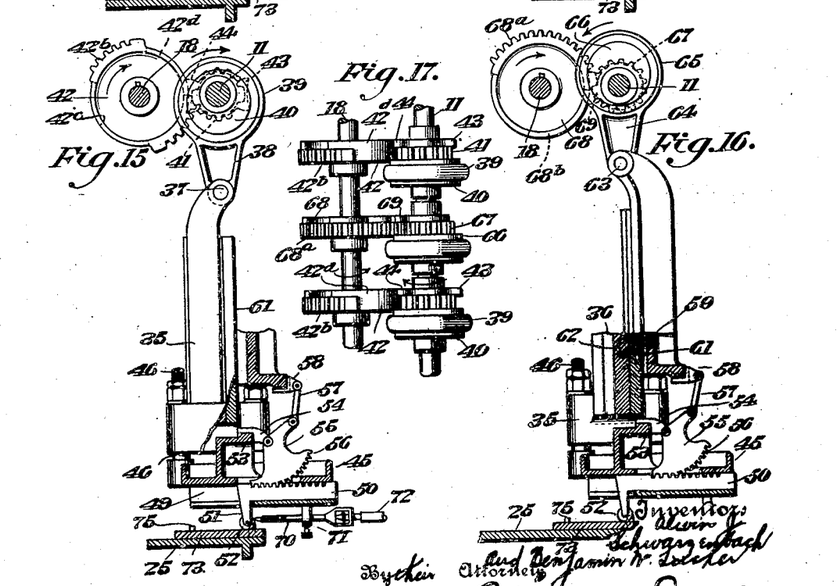
Figs. 15, 16 and 17 fragmentary views showing the positions assumed by the parts at the beginning of the creasing, crimping and curling movement.
Figures 18, 19, 20:
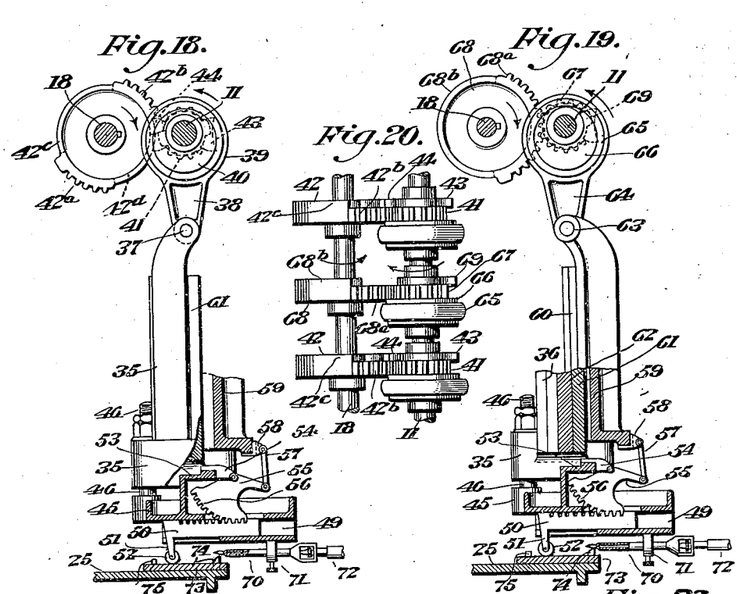
Figs. 18 to 22, inclusive, fragmentary views showing the positions of the parts at the completion of the creasing, crimping and curling movement.
Figures 21, 22, 23:
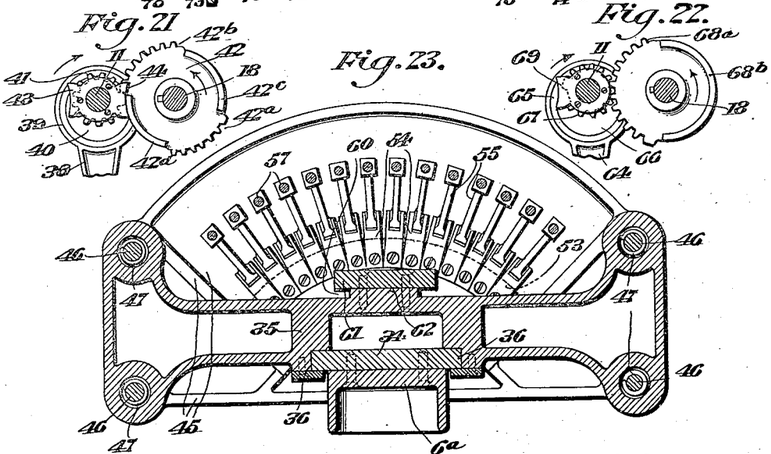
Fig. 23 a horizontal section on the line 23—23 of Fig. 10.
Figure 24:
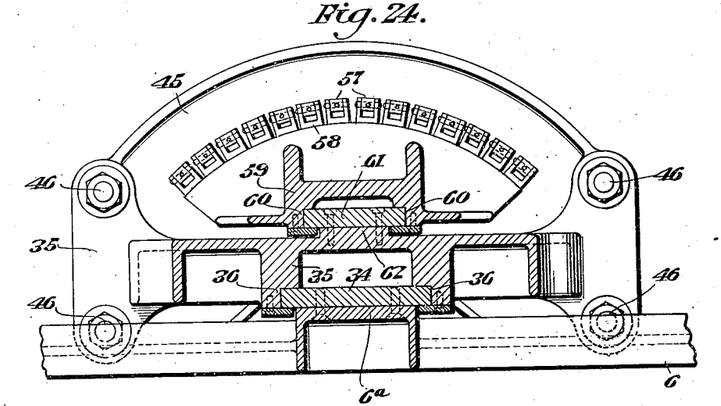
Fig. 24 a horizontal section on line 24—24 of Fig. 10.
Figures 25, 26, 27, 28, 29:
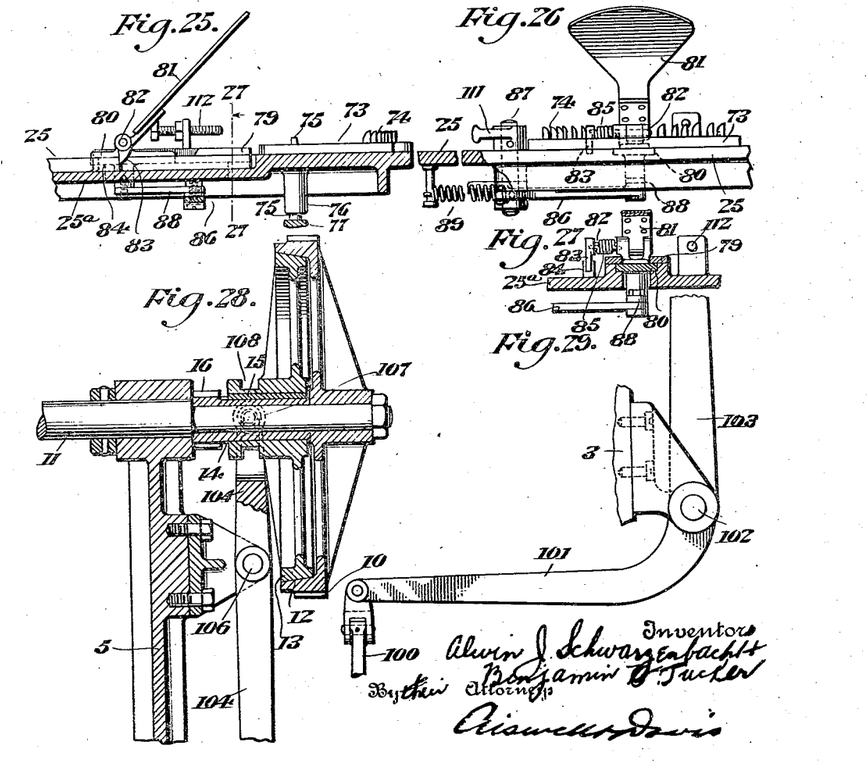
Fig. 25 a vertical sectional view on line 25—25 of Fig. 8.
Fig. 26 a front elevation of the parts shown in Fig. 25.
Fig. 27 a vertical section on line 27—27 of Fig. 25.
Fig. 28 a fragmentary vertical section on line 28—28 of Fig. 1, showing a part of the clutch mechanism.
Fig. 29 a front elevation of another part of the clutch mechanism.
Figures 30, 31:
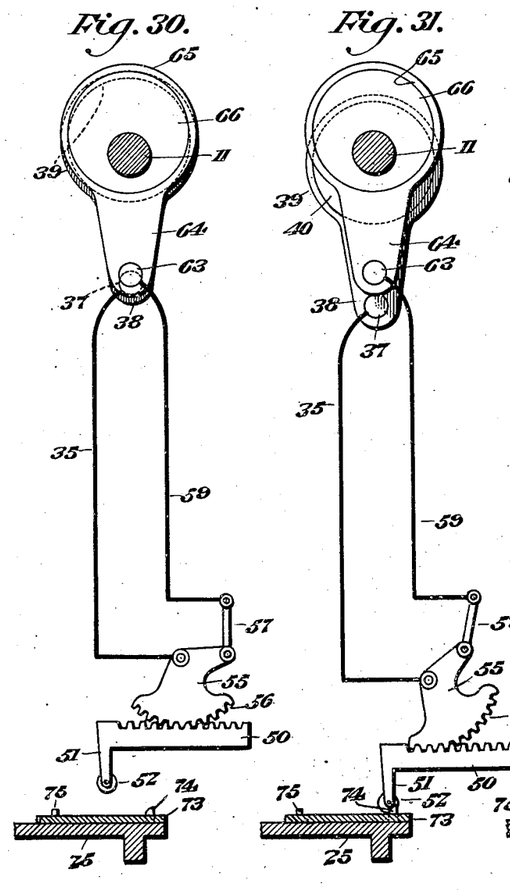
Figs. 30 to 33, inclusive, diagrammatic views showing the operation of the creasing, crimping and curling means.
Figure 32:
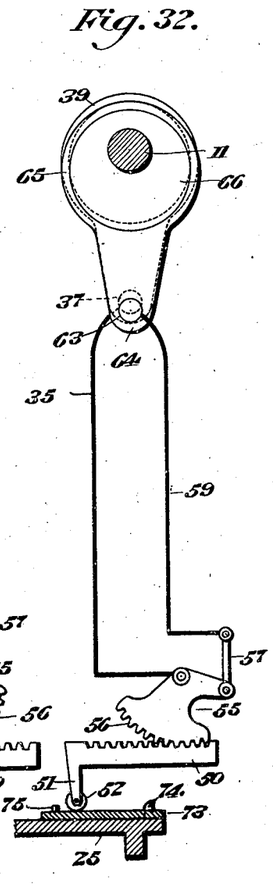

The several parts of the machine are shown in their normal positions in Figs. 1, 4, 8, 10 to 14, 30, 36 and 38. To operate the machine, the operator closes a suitable switch controlling the circuit through motor 7, depresses the treadle 97, and holds the treadle down as long as it is desired to run the machine. As the table is rotated step by step the blank supports 73 are successively presented at the point "S" (Fig. 36) at the front of the machine, with the gripper plates 81 in elevated position, and the operator places a blank X upon each support, with the pins 75 projecting through the apertures Z in the blank and the outer ends of petals Y lying between the fingers 74, during the time the table is locked by the Geneva motion. Assuming blanks to have been so successively placed upon the four supports at the right of the table and the parts to be in normal position, it will be seen that as shaft 18 starts its next succeeding revolution, the toothed portions 42ª of gears 42 will rotate pinions 41 and eccentrics 40 one-half a revolution to the position shown in Figs. 15 and 17, the locking shoes 43 leaving flanges 42ᶜ at the beginning of this movement and the locking shoes 44 engaging flanges 42ᵈ at the completion of the movement. The cross-head 35 is thus lowered, causing a downward movement of the curling and creasing rollers 52 and also a simultaneous rearward movement of the rollers owing to the relative movement between cross-head 35 and cross-head 59. The cross-head 59 is held against movement during the first quarter of the revolution of shaft 18 by locking shoe 69, and cross-head 35 is held in lowered position during the second quarter of the revolution of shaft 18 by the engagement of locking shoes 44 with flanges 42ᵈ on gears 42. During the second quarter-revolution of shaft 18 pinion 67 and eccentric 66 will be rotated one-half a revolution as one-half of toothed portion 68ª of gear 68 engages said pinion, thus lowering cross-head 59 and causing the two cross-heads and the actuating gearing to assume the positions shown in Figs. 18 to 22. The downward movement of cross-head 59 rocks the bell cranks 56 from the positions shown in Figs. 15, 16 and 31 to the positions shown in Figs. 18, 19, and 32, thus forcing racks 50 forwardly and moving the rollers 52 longitudinally of the petals Y on blanks X, scoring the petals longitudinally centrally thereof. As the rollers are held down upon the yieldable blank supports under pressure, the petals will be pressed into the rubber supports along medial lines by the rollers, and will be transversely crinkled and also curled, as shown in Figs. 39 to 45.

During the first quarter-revolution of shaft 18, the disk 28 rotates one quarter of a revolution, carrying the high part of the cam groove 95 around until roller 94 on bell-crank 93 is at the beginning of one of the inclines connecting the high and low parts of the groove. At the end of the second quarter-revolution the cam disk assumes the position shown in Fig. 37, causing the toothed portion 93ª of the bell crank to rock the cam 91 relatively to table 25 in the direction of the arrow "A" during the second quarter-revolution, from the position shown in Fig. 36 to the position shown in Fig. 37. This movement of cam 91 relatively to the three-arm levers 86 controlling the gripper plates 81 permits spring 89 to rock lever 86 and move the slide carrying the gripper 81 at point "G" outwardly, whereupon said gripper will be forced downwardly by its spring 85 to clamp the blank on its associated blank support. This movement of cam 91 also rocks lever 86, controlling the gripper plate 81 associated with the blank support at the curling point "C" at the rear of the machine, to force the slide carrying said gripper inwardly, thus retracting the gripper plate in advance of the scoring and curling rolls 52, as shown in Figs. 39 to 44. As the roller 90 of the last-mentioned lever 86 rides upon the high part of cam 91 the rock arm 83 on the rock shaft of the gripper plate engages the adjacent stop 84 and rocks the gripper plate upwardly away from its associated blank support as the rolls 52 reach the limit of their forward movement. During the third quarter-revolution of shaft 18 the cross-heads 35 and 59 are simultaneously elevated, the cross-head 35 being actuated as toothed portion 42$^b$ of gears 42 mesh with pinions 41, and cross-head 59 being actuated as the second half of toothed portion 68$^a$ of gear 68 meshes with pinion 67. The cross-head 59 moves relatively to cross-head 35 during the upward movement of the cross-heads, owing to the fact that eccentric 66 has a greater throw than eccentrics 40, this relative movement of the cross-head causing a simultaneous upward and rearward movement of the curling rollers 52 to their normal position owing to the upward movement of the cross-head 35 carrying the rollers and the partial rocking of bell cranks 55. During the last quarter-revolution of shaft 18 the two cross-heads are locked in raised position by reason of the engagement of locking shoes 43 with flanges 42$^c$ on gears 42, and the engagement of shoe 69 with flange 68$^b$ on gear 68. At the completion of the first half-revolution of shaft 18 and immediately upon the completion of the scoring, crimping and curling operation upon the blank at point "C," just described, the table 25 is rotated one step by the Geneva motion, in the direction indicated by the arrows, to advance the series of blank supports and grippers one step, and the cam 91 is rocked in the direction of the arrow "B" (Fig. 37), in unison with the table 25, from the position shown in Fig. 37 to that shown in Figs. 36 and 38, ready for another operation similar to the operation above described. As cam 91 and table 25 rotate in unison and in the same direction at this time, none of the levers 86 will be moved.

As each blank support 73 moves from the creasing, crimping and curling point "C" to the point "S" it passes the depressed portion 77$^a$ of track 77 and the pins 75 projecting through the support are forced downwardly to free the creased, crimped and curled blank and permit the blank to be swept from the support into a suitable receptacle by a brush 109 held to the standard 5 at the left-hand side of the machine by a bracket 110.

Figure 33:
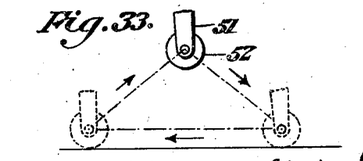
Figure 34:
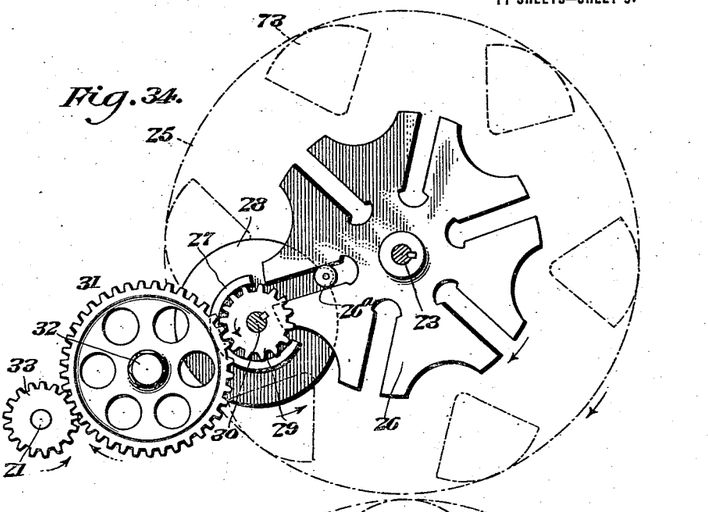
Figs. 34 and 35 bottom plan views illustrating the operation of the mechanism for rotating the feed table step by step.
Figure 35:
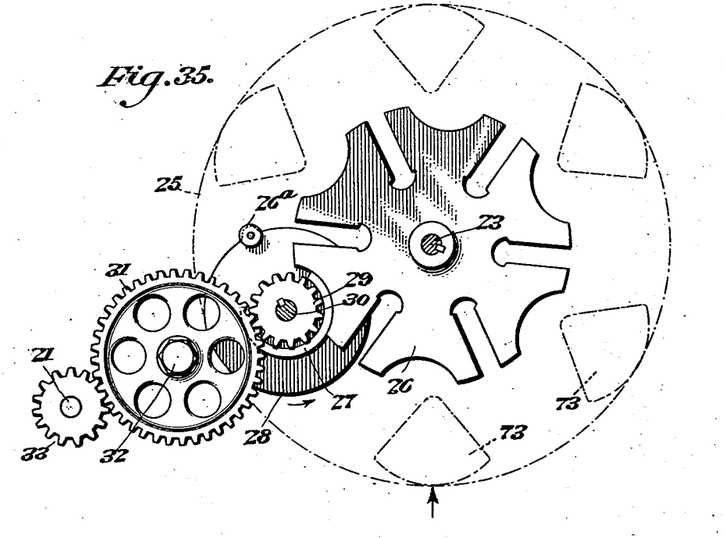

The radially inward sliding movement of the gripper plates 81 over the blanks just in advance of the rollers 52 prevents buckling of the petals as the rollers move forwardly over the petals. The rearward and downward movement of the rollers to the starting point, indicated in Fig. 33, causes the rollers to engage and move the free ends of the petals downwardly between the fingers 74 on the blank support and smooth out upon the support any deflected petals prior to the creasing, crinkling and curling movement of the rollers. The gripper plates 81 are each provided with a pair of elongated slots 81$^a$ through which the pins 75 project to permit the above-described horizontal movement of the gripper plates relatively to the blank supports. The heating of the rollers 52 serves to assist the curling and scoring action of the rollers and to assist in giving permanence to the shape of the petals. While the rollers 52 are shown as provided with circumferential grooves, it will be obvious that the edges of the rollers may be of any other suitable form. By employing grooved rollers, each petal is scored longitudinally centrally thereof along two closely adjacent parallel lines to simulate the central rib of the flower petal. It will be obvious that the machine may be employed for simply creasing and curling petals, if desired, in which case non-yieldable blank supports would be substituted for the rubber blank supports.

What we claim is:

1. In a machine of the class set forth, the combination of a plurality of rollers, a blank support, a gripper plate adapted to clamp a blank upon said support, means for moving the rollers simultaneously over the support, and means for sliding the gripper plate over the blank relatively to the blank support in advance of the rollers.

2. In a machine of the class described, the combination of a rotary feed table, a series of blank supports mounted on said table, a group of scoring devices arranged in juxtaposition at one side of the table and above said table, means for rotating said table step by step to present the blank supports successively beneath the group of scoring devices, means for moving the scoring devices toward and from the table between each step-by-step movement of the table, means for moving the scoring devices horizontally over a blank support while said devices are in their lowered position, a series of radially movable slides mounted on the table adjacent the inner ends of the blank supports, a series of gripper plates pivotally held to the slides adapted to clamp blanks upon the blank supports, means for swinging said gripper plates into engagement with the blank supports as each support is advanced toward the scoring devices, means for retracting the slides as the scoring devices move over the blank supports to slide the gripper plates over the blanks in advance of the scoring devices, and means for swinging the plates upwardly at the conclusion of the inward movement of the slides.

3. In a machine of the class described, the combination of a rotary feed table, a series of blank supports mounted on said table, a group of scoring devices arranged in juxtaposition at one side of the table and above said table, means for rotating said table step by step to present the blank supports successively beneath the group of scoring devices, means for moving the scoring devices toward and from the table between each step-by-step movement of the table, means for moving the scoring devices horizontally over a blank support while said devices are in their lowered position, a series of radially movable slides mounted on the table adjacent the inner ends of the blank supports, a series of gripper plates pivotally held to the slides adapted to clamp blanks upon the blank supports, means for swinging said gripper plates into engagement with the blank supports as each support is advanced toward the scoring devices, means for retracting the slides as the scoring devices move over the blank supports to slide the gripper plates over the blanks in advance of the scoring devices, means for swinging the plates upwardly at the conclusion of the inward movement of the slides, and means for removing the blanks from the supports after the supports are moved from beneath the scoring devices.

4. In a machine of the class described, the combination of a blank support, a group of horizontally shiftable scoring devices, a vertically reciprocable support for said devices, means for shifting said scoring device support toward and from the blank support, a vertically reciprocable member, means for moving said member relatively to the scoring device support, and connections between said member and the scoring devices for moving the scoring devices horizontally relatively to the scoring device support.

5. In a machine of the class set forth, the combination of a blank support, a vertically reciprocable support, a plurality of slides mounted on said vertically reciprocable support to move horizontally relatively thereto, scoring devices carried by said slides, means for shifting said slide support toward and from the blank support, and means for reciprocating said slides relatively to the slide support.

6. In a machine of the class set forth, the combination of a blank support, a slide support, a plurality of slides mounted in the slide support to move horizontally relatively to the support along converging paths, means for imparting a relative vertical movement between the blank support and slide support, scoring devices carried by the slides, and means for reciprocating the slides relatively to the slide support.

7. In a machine of the class set forth, the combination of a blank support, a rack support, a plurality of racks slidably mounted on the rack support to move horizontally relatively thereto, scoring devices carried by said racks, means for moving the rack support vertically relatively to the blank support, a plurality of segments pivotally mounted on the rack support and meshing with the racks, and means connected with said segments for rocking the same about their pivots.

8. In a machine of the class set forth, the combination of a blank support, a rack support, a plurality of racks slidably mounted on the rack support to move horizontally relatively thereto, scoring devices carried by said racks, means for moving the rack support vertically relatively to the blank support, a plurality of bell-crank levers pivotally mounted on the rack support and each provided at one end with a toothed segment meshing with one of the racks, and means connected with the other ends of said bell-crank levers and reciprocable relatively to the rack support for simultaneously actuating the racks.

9. In a machine of the class set forth, the combination of a blank support, a rack support shiftable toward and from the blank support, a plurality of racks slidably mounted on the rack support to move transversely of the path of movement of the rack support along converging paths, scoring devices carried by the racks, a plurality of toothed segments pivotally mounted on the rack support and meshing with the racks, and means for rocking said segments simultaneously.

10. In a machine of the class set forth, the combination of a blank support, a vertically reciprocable cross-head, a rack support held to said cross-head, a plurality of racks slidably mounted on said rack support to move horizontally relatively to the support along converging paths, a plurality of bell-crank levers pivotally mounted on the rack support and each provided with a toothed segment at one end meshing with one of said racks, a second vertically reciprocable cross-head, a series of links connecting the other ends of said bell-crank levers with said second cross-head, and means for shifting said cross-heads downwardly in succession.

11. In a machine of the class set forth, the combination of a blank-support, a vertically reciprocable cross-head, a rack support held to said cross-head, a plurality of racks slidably mounted on said rack support to move horizontally relatively to the support along converging paths, a plurality of bell-crank levers pivotally mounted on the rack support and each provided with a toothed segment at one end meshing with one of said racks, a second vertically reciprocable cross-head, a series of links connecting the other ends of said bell-crank levers with said second cross-head, and means for shifting said cross-heads downwardly in succession, and elevating the same simultaneously, said means imparting a greater vertical movement to the second cross-head than to the other cross-head.

12. In a machine of the class set forth, the combination of a blank support, a vertically reciprocable cross-head, a rack support held to said cross-head, a plurality of racks slidably mounted on said rack support to move horizontally relatively to the support along converging paths, a plurality of bell-crank levers pivotally mounted on the rack support and each provided with a toothed segment at one end meshing with one of said racks, a second vertically reciprocable cross-head, a series of links connecting the other ends of said bell-crank levers with said second cross-head, means for shifting said cross-heads downwardly in succession and elevating the same simultaneously, said means imparting a greater vertical movement to the second cross-head than to the other cross-head, and means forming a vertically yieldable connection between the rack support and the first-mentioned cross-head.

13. In a machine of the class set forth, the combination of a rotary table, means for intermittently rotating said table, a scoring device above said table, a circular series of blank supports on the table, means for lowering and raising the scoring device during each period of rest of the table, and means for reciprocating the scoring device horizontally in the same direction during the downward and upward movements thereof and in the opposite direction while the scoring device is lowered.

14. In a machine of the class set forth, the combination of a blank support, blank-positioning means on said support, a plurality of scoring rollers, means for moving said rollers diagonally downward from a position above a blank carried by the support into engagement with the free ends of petals formed on the blank and then shifting the rollers horizontally over the blank toward the base of the petals and elevating the rollers, a gripper plate adapted to clamp a blank upon the support, and means for sliding said plate over a blank on the support in advance of the rollers during the horizontal movement of the rollers.

15. In a machine of the class set forth, the combination of petal supporting means, a petal scoring device, means for shifting the scoring device longitudinally of a petal on the supporting means, and a gripper plate shiftable over the petal in advance of the scoring device to prevent buckling of the petal as the scoring device moves along the petal.

16. In a machine of the class set forth, the combination of petal scoring and curling means, a plurality of blank supports, blank positioning devices reciprocable through the blank supports, means for automatically projecting and retracting said positioning devices, and stationary means located in the path of the blank supports at one side of the scoring means adapted to sweep the scored and curled blanks from the blank supports.

17. In a machine of the class set forth, the combination of a blank support, a pivotally and slidably mounted blank clamping plate, means for swinging said plate into engagement with a blank on the support, means for sliding the plate over the blank, scoring means, means for moving the scoring-means over the blank immediately behind said plate during the sliding movement thereof, and means for swinging said plate away from the support.

18. In a machine of the class set forth, the combination of a blank support, a pivotally and slidably mounted blank clamp, means movable through the support to position a blank, means for swinging said clamp into engagement with a positioned blank, means for sliding the clamp over the blank, scoring means, means for moving the scoring means over the blank behind the clamp during the sliding movement of the clamp, means for swinging the clamp away from the plate, and means for withdrawing the positioning means from engagement with the blank.

19. In a machine of the class set forth, the combination of a blank support, a pivotally and slidably mounted blank clamp, means movable through the support to position a blank, means for swinging said clamp into engagement with a positioned blank, means for sliding the clamp over the blank, scoring means, means for moving the scoring means over the blank behind the clamp during the sliding movement of the clamp, means for swinging the clamp away from the plate, and means for withdrawing the positioning means from engagement with the blank, and means for removing the released blank from the support.

20. A machine of the class set forth comprising a blank support, a series of rollers, and means for moving the rollers diagonally downward from positions overlying a blank on the support into engagement with the free ends of petals formed on the blank and then moving the rollers horizontally while lowered toward the inner ends of the petals and subsequently elevating the rollers.

21. A machine of the class described, comprising a blank support, a series of rollers, and means for moving the rollers diagonally downward into engagement with the free ends of the petals of a blank on said support and then horizontally toward the inner ends of the petals, said roller moving means being adapted to move the rollers diagonally upward to positions intermediate the limits of their horizontal movement.

This specification signed this seventh day of May, A. D. 1919.

ALWIN J. SCHWARZENBACH.
BENJAMIN W. TUCKER.